Nov. 9, 1965  A. CASTELA  3,216,639
GRIPPING CLAMPS FOR PULL-OFF ENDLESS CHAINS
Filed April 15, 1963  2 Sheets-Sheet 1

INVENTOR.
ANDRÉ CASTELA
BY
Toulmin & Toulmin
ATTORNEYS

Nov. 9, 1965  A. CASTELA  3,216,639
GRIPPING CLAMPS FOR PULL-OFF ENDLESS CHAINS
Filed April 15, 1963
2 Sheets-Sheet 2

INVENTOR.
ANDRÉ CASTELA
BY
Toulmin & Toulmin
ATTORNEYS though a different angular interval

United States Patent Office
3,216,639
Patented Nov. 9, 1965

3,216,639
GRIPPING CLAMPS FOR PULL-OFF ENDLESS CHAINS
André Castela, Rueil-Malmaison, France, assignor to Institut Francais du Pétrole, des Carburants et Lubrifiants, Rueil-Malmaison, Seine-et-Oise, France
Filed Apr. 15, 1963, Ser. No. 273,170
Claims priority, application France, Apr. 19, 1962, 895,082
2 Claims. (Cl. 226—173)

This invention relates to gripping clamps particularly suitable for use in pull-off endless chains adapted to exert traction forces on cylindrical elongate members such as tubes or cables and particularly flexible tubes of the type sustaining without substantial deformation both compression and traction strains.

Up to the present the endless chains in use particularly for handling cables were generally provided with gripping clamps having the shape of half-cylinder shells fitting with the tube profile.

Such endless chains of conventional type are described for instance in the Patent 2,892,535 to R. H. Cullen et al. entitled "Apparatus for Handling Hose or Similar Elongate Members."

The efficiency of such gripping clamps for the transmission of traction strains to a rigid, non-deformable tube was rather poor. Such gripping clamps are, on the contrary, well adapted for the transmission of traction strains to a tube comprised of a deformable material since they provide for a tightening of the tube substantially over its whole section resulting in a distribution of the traction strains substantially over the entirety of the tube contact surface, whereby a constant pressure is applied thereon.

In the case of flexible but only slightly deformable tubes of the above-mentioned type, used for instance in drilling operations, the transmission of the traction strains is better than in the case of a completely rigid tube but is still relatively low and makes it necessary to use endless chains provided with numerous gripping clamps so as to press the tube over a lengthy portion thereof.

It is therefore an object of this invention to avoid this drawback by providing a lightened surface device comprising endless chains of substantially reduced size for a given traction force to exert on the tube.

It is another object of this invention to provide gripping clamps which are well adapted to the transmission of the traction strains from the endless chains to the flexible tube engaged therebetween, said tube being made of a flexible material such as rubber or a plastic material and comprising internal metallic reinforcements so that it can be used in drilling operations in place of the conventional drill string.

These and other objects as may be apparent from the following specification and claims are achieved by means of the gripping clamp members according to this invention comprising a pair of gripping clamps adapted to grip the tube over at most one fourth, i.e. 90° of its section, the gripping clamps of each pair being articulated on the same support member secured on one of the two endless chains, whereby four separately articulated gripping clamps of two opposite gripping clamp members surround each section of the tube engaged between the endless chains.

These gripping clamps are so shaped that their cross section corresponds to an arc of circle covering an angular interval of at most 90°. The accompanying drawing illustrates by way of example a cross section of the tube and the four gripping clamps of two gripping clamp members in frictional contact therewith.

It has been observed that due to the use of gripping clamps as hereabove defined the efficiency of the transmission of the traction strains from the endless chains to the tube was greatly enhanced in the case where the tube is only slightly deformable and capable to sustain a certain tightening pressure. This unexpectedly enhanced efficiency may be possibly explained by the fact that, due to the separate articulations of the gripping clamps, the strains are transmitted substantially perpendicularly to the tube surface.

Figure 1:
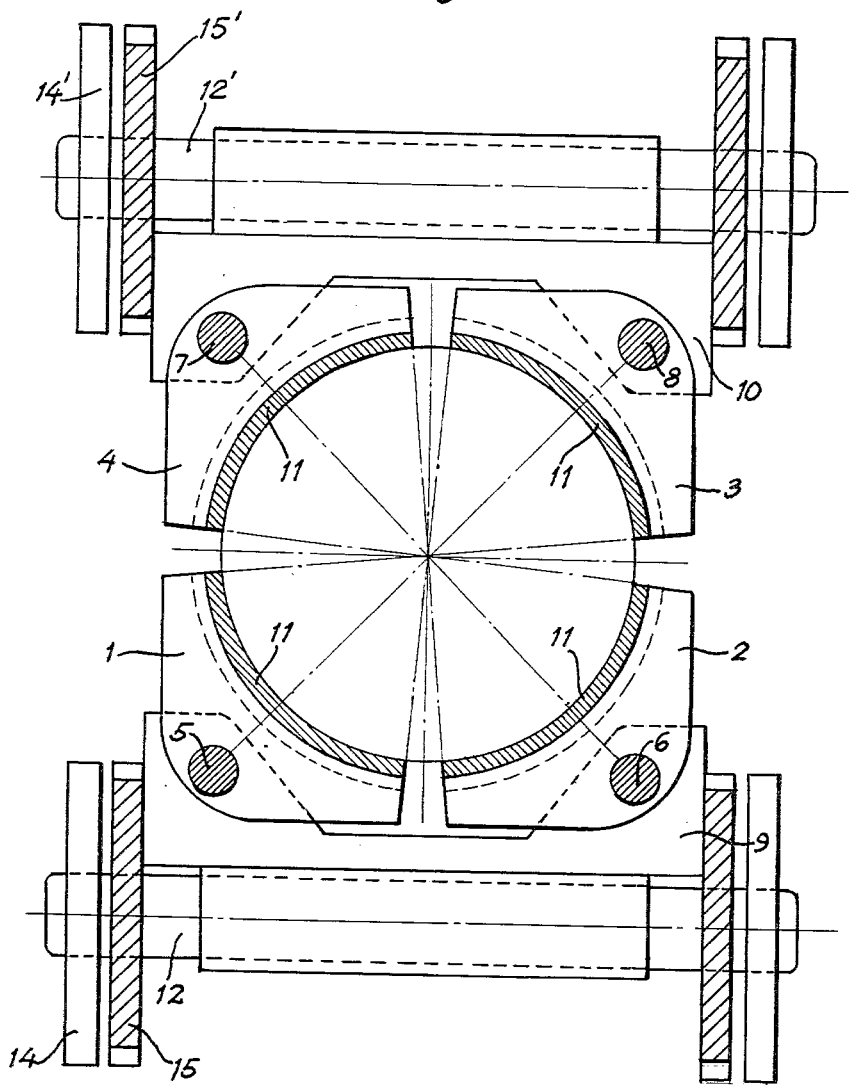
FIGURE 1 is a transverse section of FIGURE 2 taken on line 1—1, showing a pair of gripping clamps mounted on each endless chain.
Figure 2:
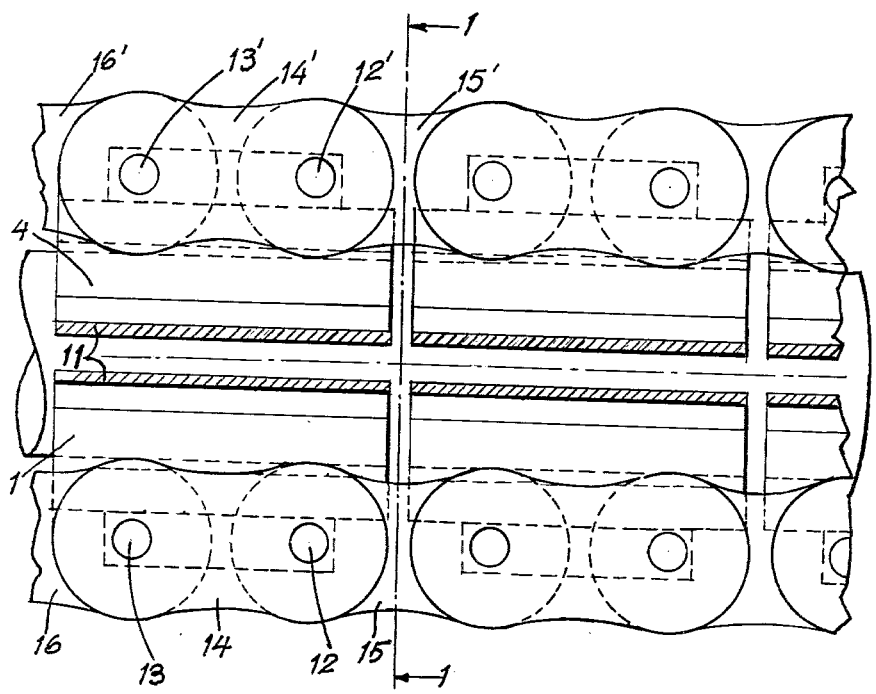
FIGURE 2 shows a longitudinal view of the two endless chains clamping a tube or cable.

As shown in the drawing the four gripping clamps 1, 2, 3 and 4 surround the tube. The two gripping clamps 1 and 2 are respectively articulated on the shafts 5 and 6 mounted on a support member 9 which is fixedly secured to the pivot axes 12 and 13 for connecting links 14 of a chain with adjacent links 15 and 16 whereas the two other gripping clamps 3 and 4 are articulated respectively on the shafts 7 and 8 mounted on the support member 10 which is fixedly secured to the pivot axis 12' and 13' for connecting links 14' of a chain with adjacent links 15' and 16'. The two shafts of each support member are positioned at an angular interval of about 90° from each other with respect to the tube axis.

The internal part of the support members 9 and 10 (in dash-points on the drawing) is so shaped as to avoid any risk of contact of the tube therewith when the gripping clamps are pushed nearer to each other while pivoting around their respective shaft until the rubbing surface thereof fits in the best possible manner with the tube surface. This happens particularly in the case where the tube engaged between the endless chains has a radius smaller than the radius of curvature of the gripping clamps.

The gripping clamps are made of any convenient material such as, for instance, a metal and comprise a rubbing surface 11 having a cross sectional profile corresponding to an arc of circle and which is comprised of a material exhibiting a high coefficient of friction on the tube such as for instance natural or synthetic rubber or neoprene.

The accompanying drawing shows the two pairs of gripping clamps of two opposite gripping clamp members surrounding a tube section and the two supports of said members which are respectively secured on the two endless chains so as to be diametrically opposed to each other with respect to the tube axis, the tube being tightened between the four articulated gripping clamps.

The angular sector corresponding to the rubbing surface of each gripping clamp will be preferably chosen as large as possible, i.e. as near as possible to 90°. However it must be reduced in proportion to the difference between the radius of the narrower tube which is intended to pass between the endless chains and the radius of curvature of the rubbing surfaces of the gripping clamps.

As a matter of fact, the larger the angular sector corresponding to the rubbing surface of each gripping clamp is, the greater is the surface of contact between the latter and the tube and the higher is the traction strain which may be transmitted thereby from the endless chains to the tube.

In most cases there may be advantageously used gripping clamps having a rubbing surface corresponding to 80 to 85 degrees, although a different angular interval still provides substantial advantages according to the invention.

These advantages essentially consist in the transmission of higher traction forces under otherwise unchanged conditions, i.e. with gripping clamps made of materials having the same friction coefficient and tightening the tube with the same compression force.

Comparative tests have been conducted to illustrate these advantages. According to these tests the traction force transmitted from the endless chains to the tube has been measured in the two following cases:

(1) Endless chains provided with conventional stationary gripping clamps having the shape of half-cylinder shells.

(2) Endless chains provided with the articulated gripping clamps according to this invention.

The tube engaged between the endless chains in both cases was structurally the same and comprised essentially:

(1) A tubular core made of neoprene having an internal diameter of 40 mm. and an external diameter of 48 mm. Said tubular core was wrapped in an insulating rubber layer, (2) A layer of copper conductors having a 3 mm.$^2$ section wound on the tubular core with an angle of inclination of 45° with respect to the tube axis, and with a right-handed pitch, (3) An insulating layer made of a rayon braid and two neoprene tapes, surrounding the layer of conductors, (4) A layer made of steel wire strands, withstanding a traction force of 120 kg./mm.$^2$ and having a diameter of 3 mm., wound with an angle of inclination of 35°, with respect to the tube axis, on the preceding insulating layer, with a right-handed pitch, (5) A second layer of identical steel wire strands wound with a left-handed pitch on the preceding layer with an angle of inclination of 35° with resspect to the tube axis, and finally (6) An external insulating layer.

The external diameter of the tube was 80 mm. In these comparative tests all the gripping clamps were provided with a rubbing surface made of neoprene and having a radius of curvature of 40 mm. The external surface of the tube and the rubbing surface of the clamps were dry. In the conventional type of gripping clamps tested the rubbing surfaces were covering an angular sector of 160° whereas the articulated gripping clamps according to this invention were covering an angular sector of 80° each. During the tests the interior of the tube was under atmospheric pressure.

The results of these tests, expressed in kilograms of traction force in relation with different values of the gripping force (in kg.) produced by a total rubbing surface covering an angular sector of 160° of the tube, are given in the following table:

| Gripping force (in kg.) | Traction force transmitted (in kg.) | |
|---|---|---|
| | Case of a stationary gripping clamp covering 160° | Case of two articulated gripping clamps, each covering 80° |
| 200 | 460 | 800 |
| 400 | 920 | 1,300 |
| 500 | 980 | 1,520 |

The results obtained in these tests, as given in the above table, clearly show a very significant improvement in the transmission of the traction strains, which was increased by from 40 to more than 70% according to the case.

It will be understood that this invention is susceptible to further modification and, accordingly, it is desired to comprehend such modification within this invention as may fall within the scope of the appended claims.

What is claimed as this invention is:

1. Tube gripping means adapted to be mounted on opposed runs of endless drive chains comprising opposed pairs of approximately quarter-cylindrical jaws, each pair being mounted on a support member for independent pivotal movement about a given point transversely of the drive chains, each point on said support member being on a diametric line of the cylindrical surface of the respective jaw and the diametric lines of each pair of jaws intersecting each other at substantially right angles whereby when clamping a cylindrical member the four jaws independently adjust themselves in clamping position about the member.

2. The invention as defined in claim 1, wherein said jaws pivot about shafts in said support members and wherein the shafts extend parallel to the axis of the jaws.

References Cited by the Examiner

UNITED STATES PATENTS

| 1,288,866 | 12/88 | Friel. | |
| 2,339,761 | 1/44 | Bruestle | 226—172 |
| 2,339,762 | 1/44 | Bruestle | 226—173 |
| 2,752,797 | 7/56 | Sherwin | 226—173 X |
| 3,022,928 | 2/62 | Ulmitz | 226—173 X |
| 3,056,535 | 10/62 | Baugh et al. | 226—172 |

M. HENSON WOOD, JR., *Primary Examiner.*

RAPHAEL M. LUPO, ROBERT B. REEVES,
*Examiners.*